(12) United States Patent
Roth et al.

(10) Patent No.: US 10,025,646 B2
(45) Date of Patent: *Jul. 17, 2018

(54) NAMING OF NODES IN NET FRAMEWORK

(71) Applicant: AppDynamics LLC, San Francisco, CA (US)

(72) Inventors: David Roth, San Francisco, CA (US); Sanjay Nagaraj, Dublin, CA (US); Michael Margulis, Danville, CA (US); Ryan Ericson, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,837

(22) Filed: Aug. 2, 2016

(65) Prior Publication Data

US 2017/0031740 A1    Feb. 2, 2017

Related U.S. Application Data

(63) Continuation of application No. 14/256,903, filed on Apr. 18, 2014, now Pat. No. 9,405,603.

(51) Int. Cl.
*G06F 11/30* (2006.01)
*G06F 9/54* (2006.01)
*G06F 11/34* (2006.01)
*H04L 29/08* (2006.01)

(52) U.S. Cl.
CPC .............. *G06F 9/547* (2013.01); *G06F 11/30* (2013.01); *G06F 11/302* (2013.01); *G06F 11/3006* (2013.01); *G06F 11/3495* (2013.01); *H04L 67/02* (2013.01)

(58) Field of Classification Search
CPC ........ G06F 9/547; G06F 11/30; G06F 11/302; G06F 11/3006; G06F 11/3495; H04L 67/02

See application file for complete search history.

(56) References Cited

U.S. PATENT DOCUMENTS

| | | | | |
|---|---|---|---|---|
| 2003/0188040 A1* | 10/2003 | Vincent | ................... | G06F 9/455 719/317 |
| 2005/0015485 A1* | 1/2005 | Keefer | ................ | G06F 11/3006 709/224 |
| 2006/0123101 A1* | 6/2006 | Buccella | ............... | G06F 21/552 709/223 |
| 2007/0169003 A1* | 7/2007 | Branda | ............... | G06F 11/3409 717/130 |
| 2012/0291009 A1* | 11/2012 | Khare | ....................... | G06F 8/38 717/109 |
| 2013/0185729 A1* | 7/2013 | Vasic | .................... | G06F 9/5072 718/104 |

\* cited by examiner

*Primary Examiner* — Charles E Anya
(74) *Attorney, Agent, or Firm* — Parker Ibrahim & Berg LLP; James M. Behmke; Stephen D. LeBarron

(57) ABSTRACT

A system for naming a process being monitored that handles a requesting a framework such as a .NET framework. The process may be implemented by a .NET application framework within an IIS web server. The naming system allows for user readable names which are more than just numbers or indexes. The naming system is configured from a single location rather than from multiple locations, making it much easier to configure, change and update.

21 Claims, 7 Drawing Sheets

NAMING OF NODES IN NET FRAMEWORK

CROSS REFERENCE TO RELATED APPLICATIONS

This application is a continuation of U.S. patent application Ser. No. 14/256,903, titled "Naming of Nodes in NET Framework," filed Apr. 18, 2014, now U.S. Pat. No. 9,405,603, the disclosure of which is incorporated herein by reference.

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

A popular platform for providing a web service is the Internet Information Services (IIS). An IIS web server may include several applications executing on a single machine. This can be very efficient to implement, but can make monitoring of IIS applications difficult. In particular, it can be difficult to detect how individual IIS applications on the same web server are performing.

There is a need in the art for web service monitoring which may provide improved application monitoring.

SUMMARY OF THE CLAIMED INVENTION

The present technology automatically names a node (which is created by an installed agent) on an IIS web server which enables individual monitoring of applications. The applications may execute in a .NET framework on an IIS web server or other system. The naming system allows for user readable names which are more than just numbers or indexes. Additionally, the naming system allows for 'stable' naming, in which the same node (i.e., application) will receive the same name after the application restarts, whereas previously it was possible for the node to have a different name after the application restarted. The naming system is configured from a single location rather than from multiple locations, making it much easier to configure, change and update the system.

A .NET application framework may run inside an IIS web server as well as other servers. A machine may include a coordinator and an IIS server, which may include one or more applications. An application being monitored on an IIS server may include an agent and a profiler. The profiler may detect a call within or by the application and report the call to the coordinator. The coordinator may determine if the detected call is one that should be monitored, and informs the profiler appropriately. If the call should be monitored, an agent on the application is instantiated and monitors the call.

The instantiation of the agent creates a node which will be named by the system. The coordinator may generate a name for the process handling the call and associated with the node (which is associated with the agent monitoring the process). The name may be based on a hierarchy of information, including but not limited to machine name, tier, site, application, port and process identifier, as well as other information. There may be one node per application being monitored, and the calls being monitored are associated with that node. In some instances, not each and every level of the hierarchy of naming information is used in each and every node name. Data for the executing call is captured and stored along with the node name assigned to the call.

An embodiment may include a method for monitoring a business transaction. The method may detect a call by an application. A determination may be made as to whether to monitor the call. A name may be automatically generated for the node which is determined to be monitored, the name including the name of a machine on which the node resides and the name of a logical group of nodes that includes the node being called.

An embodiment may include a system for monitoring a business transaction. The system may include a processor, a memory and one or more modules stored in memory and executable by the processor. When executed, the one or more modules may detect a call by an application, determine whether to monitor the call, and automatically generate a name for the node which is determined to be monitored, the name including the name of a machine on which the node resides and the name of a logical group of nodes that includes the node being called.

DETAILED DESCRIPTION

The present technology may be used to name a process that handles a request, such as a call, in an application framework such as a .NET framework. The process may be associated with a node (which is associated with the instantiation of an agent) and may be implemented by an application that may execute in a .NET framework within an IIS web server or other server. The naming system allows for user readable names which are more than just numbers or indexes. The naming system is configured from a single location rather than from multiple locations, making it much easier to configure, change and update the system.

A .NET application framework may run inside an IIS web server as well as other servers. A machine may include a coordinator and an IIS server, which may include one or more applications. An application being monitored on an IIS server may include an agent and a profiler. The profiler may detect a call within or by the application and report the call to the coordinator. The coordinator may determine if the detected call is one that should be monitored, and informs the profiler appropriately. If the call should be monitored, an agent on the application is instantiated and monitors the process handling the call. The coordinator may generate a name for the node associated with the agent monitoring the process based on a hierarchy of information, including but not limited to machine name, tier, site, application, port and process identifier, as well as other information. There may be one node per application being monitored, and the calls being monitored may all be associated with that node. In some instances, not each and every level of the hierarchy of naming information is used in each and every node name.

Data for the executing call is captured and stored along with the node name assigned to the call.

Figure 1A:
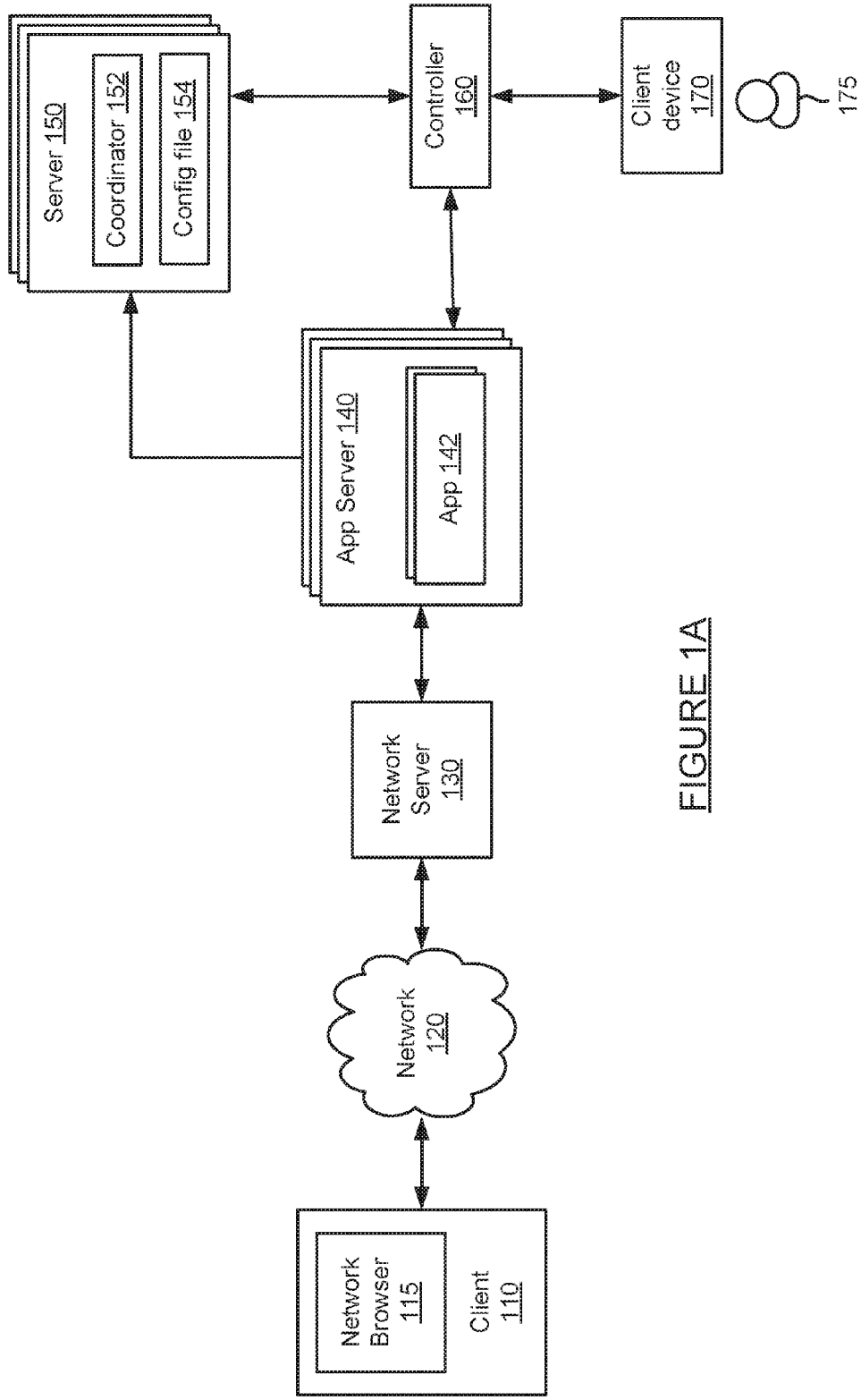
FIG. 1A is a block diagram of a system for naming a .NET application.

FIG. 1A is a block diagram for naming a .NET application. FIG. 1A includes client 110, network 120, network server 130, application server 140, server 150, controller 160, and client device 170. Client 110 may communicate with network server 130 over network 120. Client 110 may be any sort of computing device, such as for example a desktop computer, a work station, a lap top computer a mobile device such as a smart phone or a tablet computer, or some other computing device. Client 110 may include network browser 115 as well as other software. Network browser 115 may be stored on client 110 and executed by one or more processors to provide content through an output device of client 110. The content may be received from application server 140 via network server 130 and network 120. Client 110 may receive input from a user through network browser 115 and communicate with application 1 server to provide content to the user.

Network 120 may facilitate communication of data between different servers, devices and machines. The network may be implemented as a private network, public network, intranet, the Internet, a Wi-Fi network, cellular network, or a combination of these networks.

Network server 130 is connected to network 120 and may receive and process requests received over network 120. Network server 130 may be implemented as one or more servers implementing a network service. When network 120 is the Internet, network server 125 may be implemented as a web server. Network server 130 and application server 140 may be implemented on separate or the same server or machine.

Application server 140 may include one or more applications 142. Application server 140 may be implemented using one or more servers which communicate with network server 130, server 150, controller 160, and other devices. In some embodiments, network server 130 and application server 140 may be implemented as the same server.

Figure 1B:
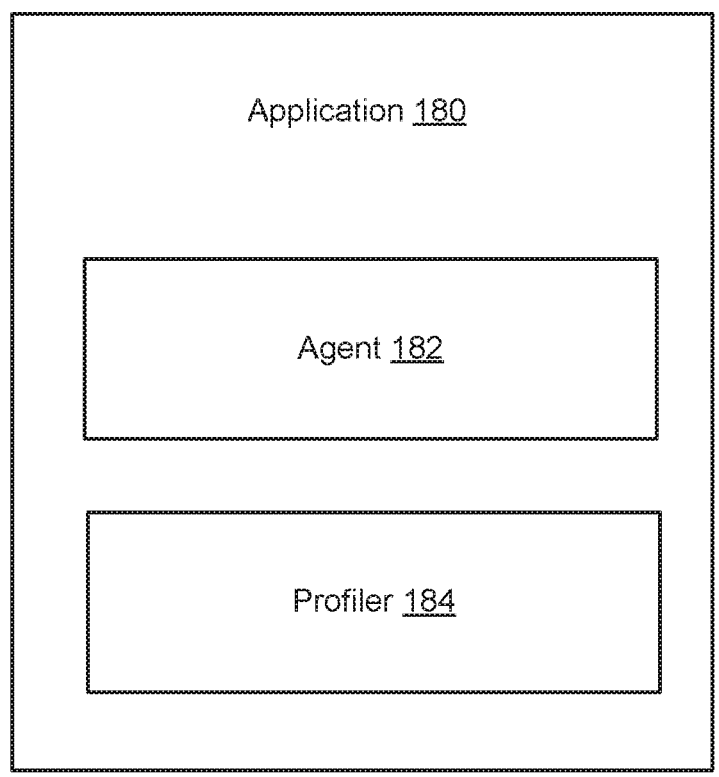
FIG. 1B is a block diagram of a node.

Application 142 may be monitored by one or more agents (see FIG. 1B). Application 142 may execute in any of a number of frameworks, such as for example a JAVA framework, a .NET framework, or other framework. Application 142 is discussed in more detail below with respect to the method of FIG. 1B.

Server 150 may communicate with application server 140, application 142 and controller 160. Server 150 may include a coordinator 152 and a configuration file 154. Coordinator 152 may coordinate naming of an application or node within a .NET framework. Configuration file 154 may be accessed by coordinator 152 and may include a list of applications that may be monitored within the system of FIG. 1A. The list of applications may be compiled automatically, based on user input, or based on other parameters.

Controller 160 may control and manage monitoring of business transactions distributed over application servers 130-160. Controller 160 may receive runtime data from agents and coordinators, associate portions of business transaction data, communicate with agents to configure collection of runtime data, and provide performance data and reporting through an interface. The interface may be viewed as a web-based interface viewable by client device 110. In some embodiments, a client device 170 may directly communicate with controller 160 to view an interface for monitoring data.

In some instances, controller 160 may install an agent into one or more application servers 140 and/or 150. Controller 160 may receive correlation configuration data, such as an object, a method, or class identifier, from a user through client device 192.

FIG. 1B is a block diagram of an application. Application 180 of FIG. 1B includes agent 182 and profiler 184.

Agent 182 may be installed on an application server by byte code instrumentation, downloading the application to the server, or in some other manner. Agent 182 may be executed to monitor an application, application server, a virtual machine, or other logical machine and may communicate with byte instrumented code on an application server, virtual machine or another application or program on an application server. Agent 182 may detect operations such as receiving calls and sending requests by an application server, virtual machine, or logical machine. Agent 182 may receive data from instrumented code, process the data and transmit the data to controller 160. Agent 182 may perform other operations related to monitoring an application or logical machine as discussed herein. For example, agent 210 may identify other applications, share business transaction data, aggregate detected runtime data, and other operations.

Profiler 184 may detect when an application makes a call and may take actions based on that detection. Profiler 184 may be implemented within or outside of application 180 on an application server. Profiler 184 may communicate with coordinator 152 to determine if the application making the call should be monitored. In some instances, profiler 184 may implement byte code to activate an agent or cause an agent to be activated in case that the application should be monitored based on information received from coordinator 152.

Figure 2:
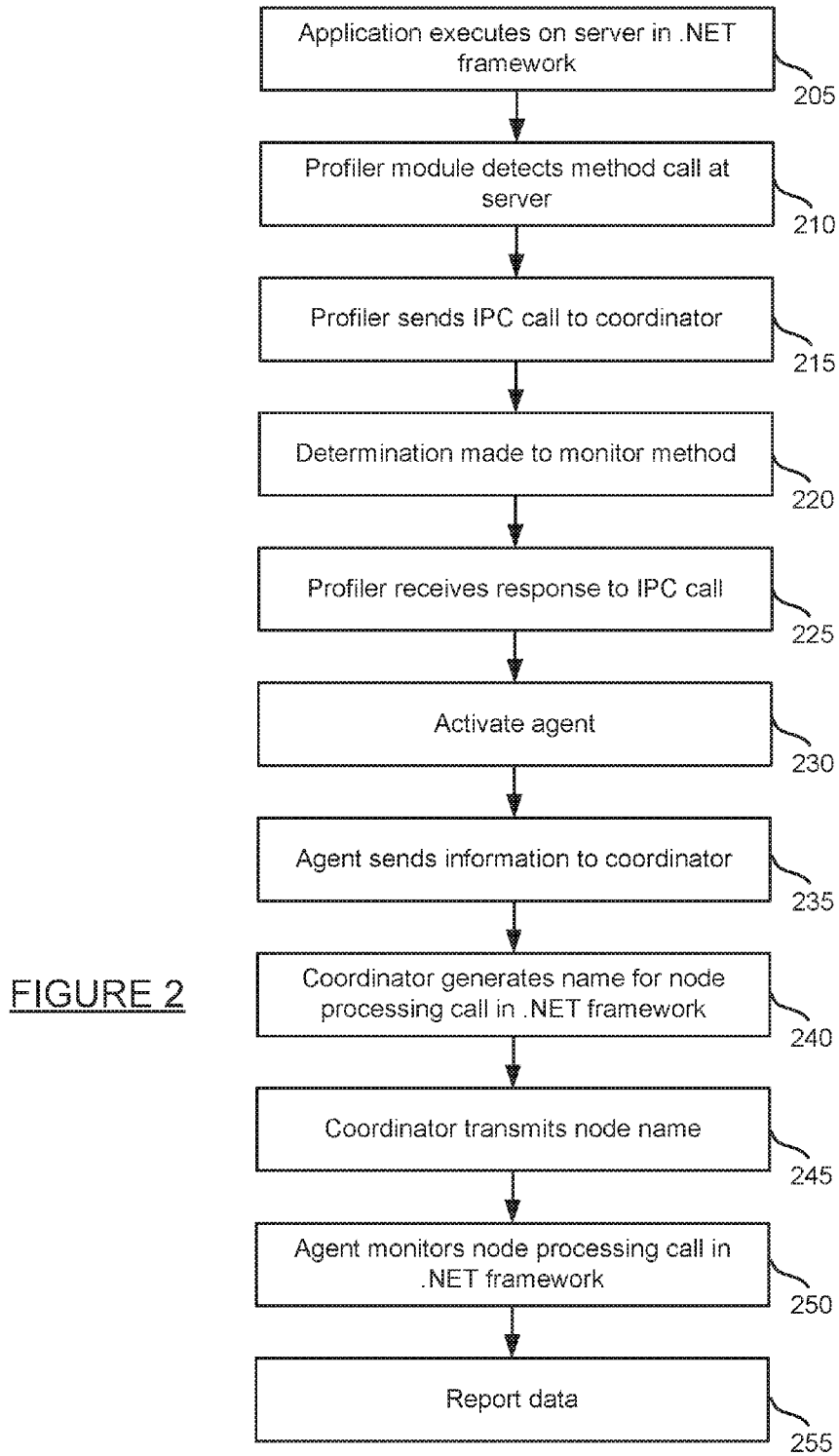
FIG. 2 is a method for naming a node.

FIG. 2 is a method for generating a name of a node. First, an application executes on a server in a .NET framework at step 205. In some embodiments, an instance of a .NET virtual machine may have one profiler instance while having several agent instances. When a profiler is initialized for a .NET virtual machine, it calls the coordinator (see step 220 below) to determine if it is a process to monitor. If not, no further action is taken. If it is a process to be monitored, detection 'hooks' are installed into various methods and more checks are made to the coordinator on each of the calls. This can result in none, one or more many agents starting up, depending on what is called and in which application domain.

A profiler module on the server may detect a method call at the server at step 210. The profiler may send an inter-process communication (IPC) call to a coordinator at step 215. The coordinator may be located at a server remote from where the call was detected. In some embodiments, the profiler may block invocation of the call while it determines from a remote coordinator whether or not the call should be monitored. The IPC call sent by the profiler indicates the name of the application which is making the call so that the coordinator may determine if that application should be monitored.

A determination is made as to whether the method should be monitored at step 220. The method may be monitored if it is identified as a method to be monitored in a list of methods to be monitored. More information for step 220 is discussed below with respect to the method of FIG. 3.

The profiler receives a response to the IPC call at step 225. The response to the IPC call may include information for configuring an agent to monitor a call if the call should be monitored. If the call should not be monitored, the response to the IPC call merely indicates this and the method of FIG. 2 ends. Information included in the response to the IPC call, if the call is to be monitored, may include event configuration data such as a coordinator address, controller address, a user name and password, an application name, and any needed proxy information.

An agent is activated at step 230. The agent may be activated using configuration information received by the profiler in response to the IPC call. More details for activating an agent are discussed below with respect to the method of FIG. 4.

The agent sends information to the coordinator at step 235. A name for a node associated with an agent that monitors the processing of a call in a .NET framework is generated by the coordinator at step 240. The coordinator generates the name for the node based on the call received from the agent once the agent is activated for the call. Generating a name by the coordinator is discussed in more detail below with respect to the method of FIG. 5.

The coordinator transmits the generated node name to the agent at step 245. The agent then monitors the process which handles the call in the .NET framework at step 250. Data associated with the monitored process (i.e., the node associated with the agent) is then reported by the agent at step 255.

Figure 3:
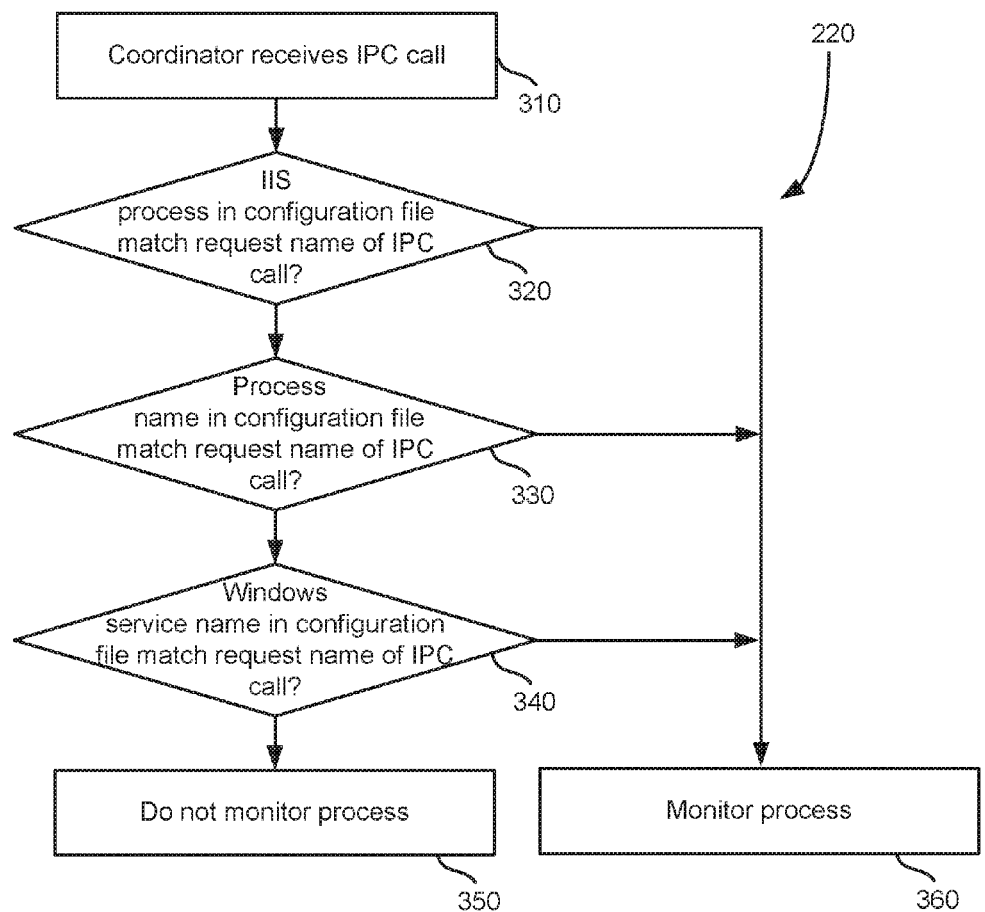
FIG. 3 is a method for determining whether or not to monitor a method.

FIG. 3 is a method for determining whether a call should be monitored. The method of FIG. 3 provides more detail for step 220 of the method of FIG. 2. First, a coordinator receives an IPC call at step 310. The coordinator, implemented at a remote server, receives the IPC call with the name of a call that may be suitable for monitoring.

A determination is then made at step 320 as to whether the configuration file includes an IIS process which matches the request name of the IPC call. If the configuration file includes a matching IIS process, the call is monitored at step 360. If the configuration file does not include an IIS process, a determination is made as to whether a process name in the configuration file matches the request name within the IPC call at step 330. If there is a matching process name, the process is monitored at step 360. If there is no matching process name, a determination is made as to whether a windows service name in the configuration file matches a request name of the IPC call at step 340. If no windows service name, process name, or IIS process is in the configuration file which matches the request name within the IPC call, the determination is made to not monitor the process at step 350. In this case, the method of FIG. 3 ends and the method of FIG. 2 would not proceed past step 220.

Figure 4:
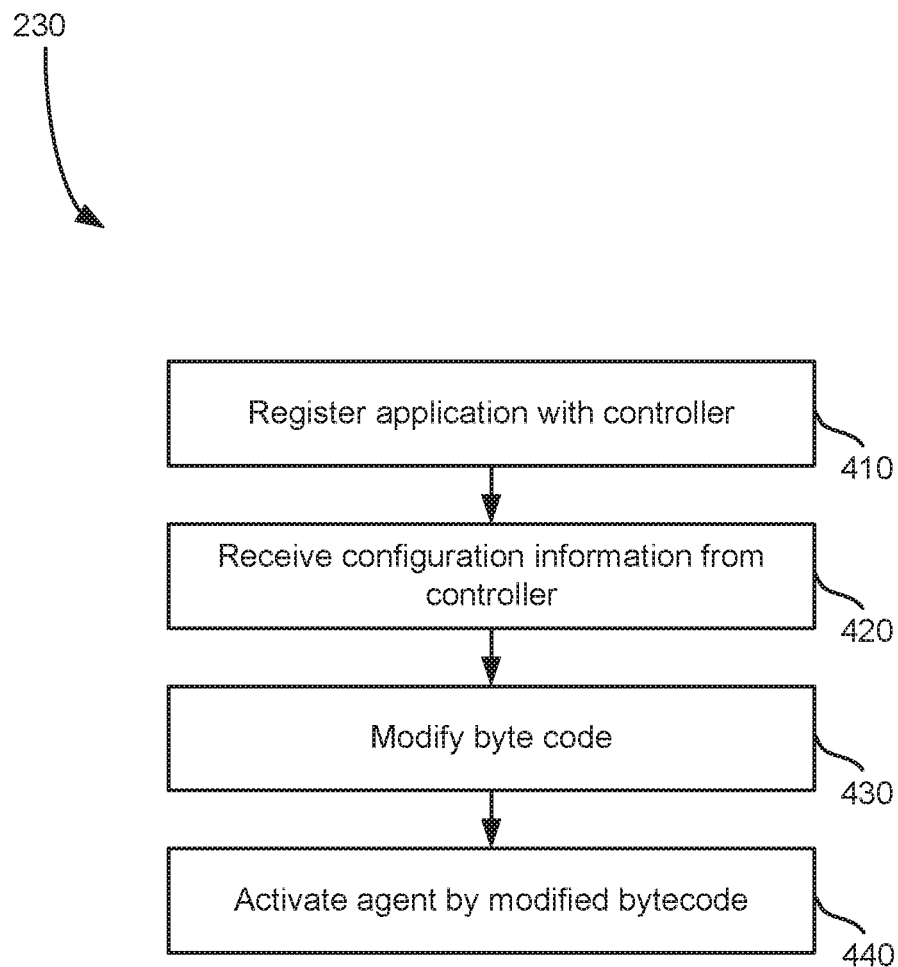
FIG. 4 is a method for activating an agent.

FIG. 4 is a method for activating an agent. The method of FIG. 4 includes more detail for step 230 of the method of FIG. 2. First, an application is registered with a controller at step 410. Configuration information is then received from the controller by an agent at step 420. Byte code of the application is modified at step 430. The modified byte code is used to activate the agent at step 440.

Figure 5:
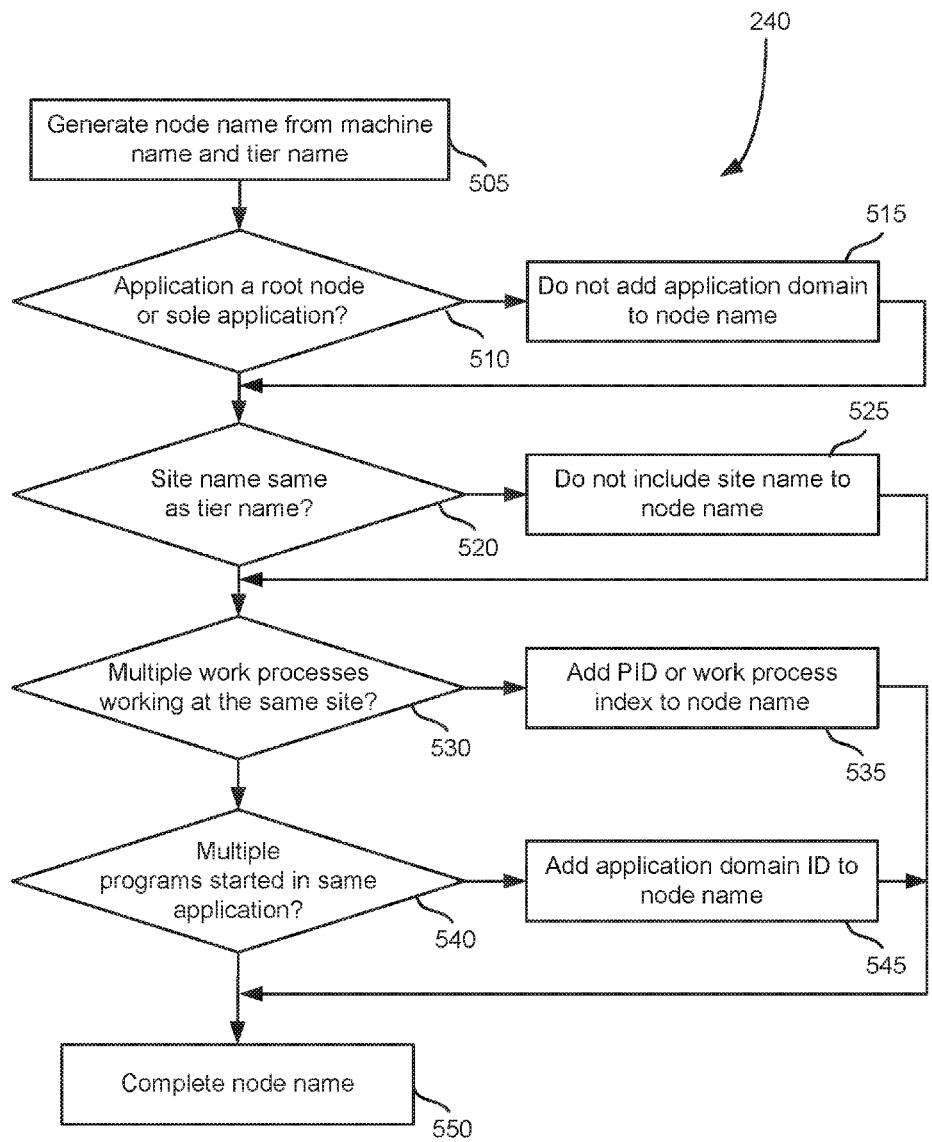
FIG. 5 is a method for generating a name for an application.

FIG. 5 is a method for generating a node name. First, a node name is generated from a machine name and tier name at step 505. The machine name may include the name of the actual hardware server on which the application is executing. The tier name may include a name of a logical group of servers that have been grouped together to form a tier. A tier may include, for example, a number of nodes or applications that implement the same application, perform a similar process within a distributed business transaction, or some other logically grouped number of nodes or applications.

A determination is made as to whether the application is a root node or a sole application. If the application is a root node or the only application, then an application name is not added to the node name at step 515. The method then continues from step 515 to 520. If the application is not a root node or sole application on an IIS web server, a determination is made as to whether the site name is the same as the tier name for the node at step 520. If the site name is the same as the tier name, the site name will not be included in the node name at step 525 and the method continues to step 530. If the site name is not the same as the tier name, a determination is made as to whether multiple work processes are working at the same site at step 530. If multiple worker processes are not working at the same site, the method of FIG. 5 continues to step 540. If there are processes working at the same site, a process identifier or a worker process index may be added to the node name at step 535. The method of FIG. 5 would then continue to step 550 where the node name is completed.

A determination is made as to whether multiple programs started in the same application at step 540. If multiple programs did not start in the same application, the node name is completed at step 560. If they did start in the same application, an application domain ID may be added to the node name at step 545. The method of FIG. 5 would then continue to step 550.

Figure 6:
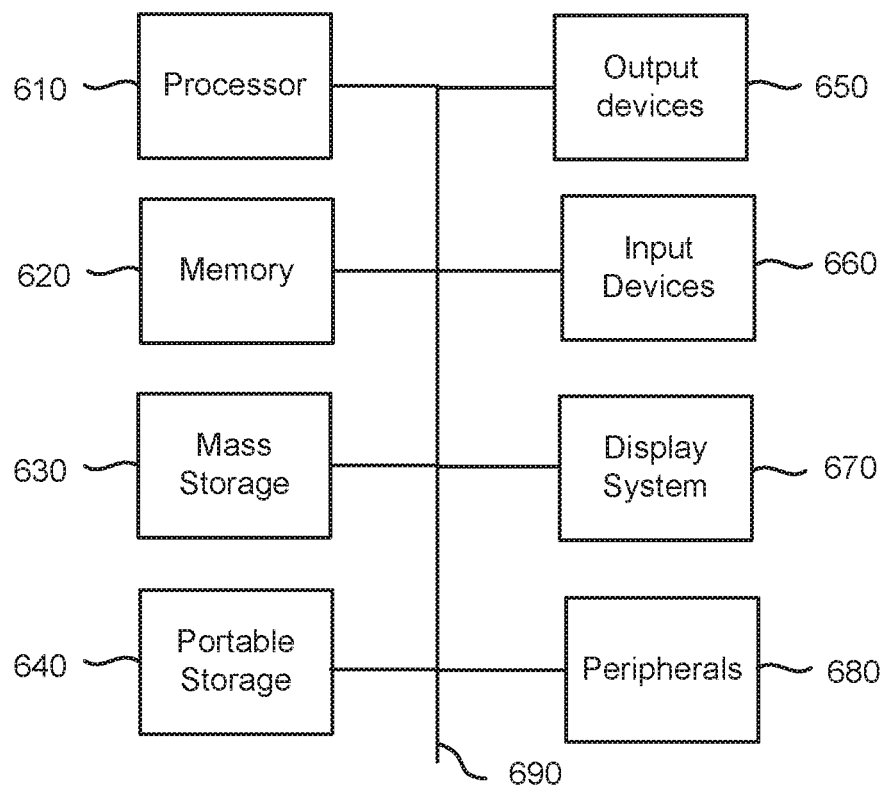
FIG. 6 is a block diagram of a computing system implementing the present technology

FIG. 6 is a block diagram of a computer system for implementing the present technology. System 600 of FIG. 6 may be implemented in the contexts of the likes of clients 110 and 170, network server 130, servers 140-150, and controller 160.

The computing system 600 of FIG. 6 includes one or more processors 610 and memory 620. Main memory 620 stores, in part, instructions and data for execution by processor 610. Main memory 610 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, or a pointing device, such as a mouse, a trackball, stylus, or cursor direction keys. Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device.

Peripherals 680 may include any type of computer support device to add additional functionality to the computer system. For example, peripheral device(s) 680 may include a modem or a router.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

When implementing a mobile device such as smart phone or tablet computer, the computer system 600 of FIG. 6 may include one or more antennas, radios, and other circuitry for communicating over wireless signals, such as for example communication using Wi-Fi, cellular, or other wireless signals.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring a business transaction, comprising:
detecting, by a profiler module stored and executed on a first server, a first method call by an application executing on the first server;
sending, by the profiler module, a second method call to a remote coordinator;
determining, by the remote coordinator, whether the first method call should be monitored, wherein the determining includes searching a configuration file for an Internet Information Services (IIS) process matching a request name in the second method call, otherwise if a match is not found, searching the configuration file for a process name matching the request name in the second method call, otherwise if a match is not found, searching the configuration file for a Windows service name matching the request name in the second method call;
in response to locating a match after the determination, instantiating an agent on the application, the agent to monitor the first method call;
in response to instantiating, generating and transmitting a third method call from the agent to the remote coordinator; and
receiving, by the agent and from the remote coordinator in response to the a third method call, an automatically generated name for a node associated with a process handing the first method call, wherein the agent is executing on the automatically named node.

2. The method of claim 1, the node name including the name of a machine on which the node resides and the name of a logical group of nodes that includes the node being called.

3. The method of claim 1, further comprising:
transmitting information regarding the detected first method call to the remote coordinator; and
receiving a message from the remote coordinator by the profiler in response to the transmitted information.

4. The method of claim 3, wherein the agent is instantiated in response to the received message.

5. The method of claim 1, wherein the application runs in a .NET framework.

6. The method of claim 1, wherein the first method call is an internet information services process.

7. The method of claim 1, further comprising automatically generating a name for the process handling the first method call.

8. A non-transitory computer readable storage medium having embodied thereon a program, the program being executable by a processor to perform a method for monitoring a business transaction, the method comprising:
detecting, by a profiler module stored and executed on a first server, a first method call by an application executing on the first server;
sending, by the profiler module, a second method call to a remote coordinator;
determining, by the remote coordinator, whether the first method call should be monitored, wherein the determining includes searching a configuration file for an Internet Information Services (IIS) process matching a request name in the second method call, otherwise if a match is not found, searching the configuration file for a process name matching the request name in the second method call, otherwise if a match is not found, searching the configuration file for a Windows service name matching the request name in the second method call;
in response to locating a match after the determination, instantiating an agent on the application, the agent to monitor the first method call;
in response to instantiating, generating and transmitting a third method call from the agent to a remote coordinator;
receiving, by the agent and from the remote coordinator in response to the third method call, an automatically generated name for a node associated with a process handling the first method call, wherein the agent is executing on the automatically named node.

9. The non-transitory computer readable storage medium of claim 8, the node name including the name of a machine on which the node resides and the name of a logical group of nodes that includes the node being called.

10. The non-transitory computer readable storage medium of claim 8, further comprising:
transmitting information regarding the detected first method call to the remote coordinator; and
receiving a message from the remote coordinator by the profiler in response to the transmitted information.

11. The non-transitory computer readable storage medium of claim 10, wherein the agent is instantiated in response to the received message.

12. The non-transitory computer readable storage medium of claim 8, wherein the application runs in a .NET framework.

13. The non-transitory computer readable storage medium of claim 8, wherein the first method call is an internet information services process.

14. The non-transitory computer readable storage medium of claim 8, wherein the automatically generated name is based on a hierarchy of information stored at the remote coordinator about the node on which the agent is executing.

15. A system for monitoring a business transaction, comprising:
   a processor;
   a memory; and
   one or more modules stored in memory and executable by a processor to perform operations including:
      detect, by a profiler module stored and executed on a first server, a method call by an application executing on the first server;
      send, by the profiler module, a second method call to a remote coordinator;
      determine, by the remote coordinator, whether the first method call should be monitored, wherein the determining includes searching a configuration file for an Internet Information Services (IIS) process matching a request name in the second method call, otherwise if a match is not found, searching the configuration file for a process name matching the request name in the second method call, otherwise if a match is not found, searching the configuration file for a Windows service name matching the request name in the second method call;
      in response to locating a match after the determination, instantiate an agent on the application, the agent to monitor the first method call;
      in response to instantiation, generate and transmit a third method call from the agent to a remote coordinator;
      receive, by the agent and from the remote coordinator in response to the third method call, an automatically generated name for a node associated with a process handling the first method call, wherein the agent is executing on the automatically named node.

16. The system of claim 15, the node name including the name of a machine on which the node resides and the name of a logical group of nodes that includes the node being called.

17. The system of claim 15, further comprising:
   transmitting information regarding the detected first method call to the remote coordinator: and
   receiving a message from the remote coordinator by the profiler in response to the transmitted information.

18. The system of claim 17, wherein the agent is instantiated in response to the received message.

19. The system of claim 15, wherein the application runs in a .NET framework.

20. The system of claim 15, wherein the first method call is an internet information services process.

21. The system of claim 20, wherein the node receives the same name after each restart of the application.

* * * * *